Figure 1:

(No Model.)  3 Sheets—Sheet 1.

F. JEWETT.
BICYCLE.

No. 481,569.  Patented Aug. 30, 1892.

WITNESSES:
H. A. Lamb
Edith G. Ely.

INVENTOR
Frank Jewett
BY
A. M. Wooster
ATTORNEY.

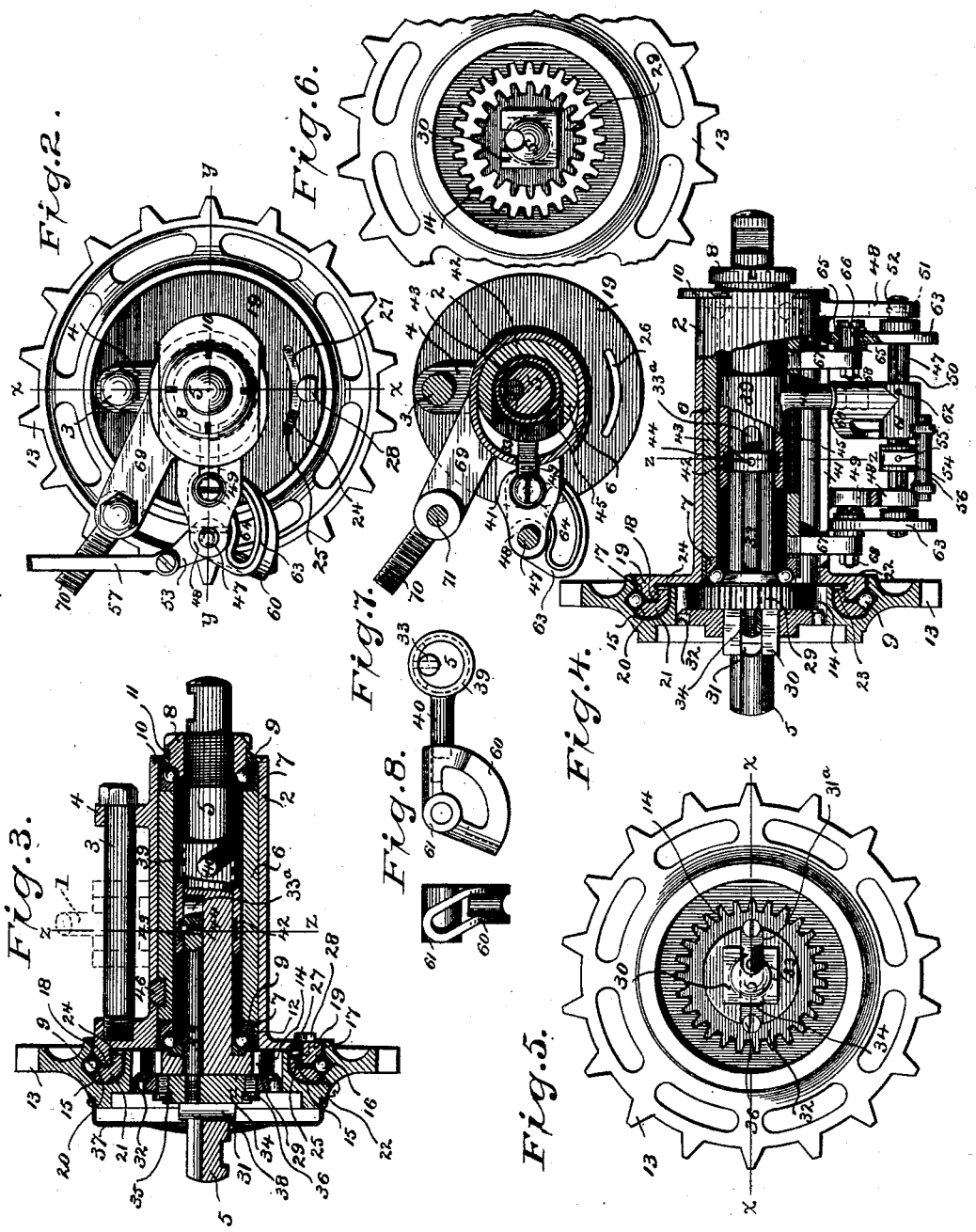

(No Model.) 3 Sheets—Sheet 3.
F. JEWETT.
BICYCLE.
No. 481,569. Patented Aug. 30, 1892.
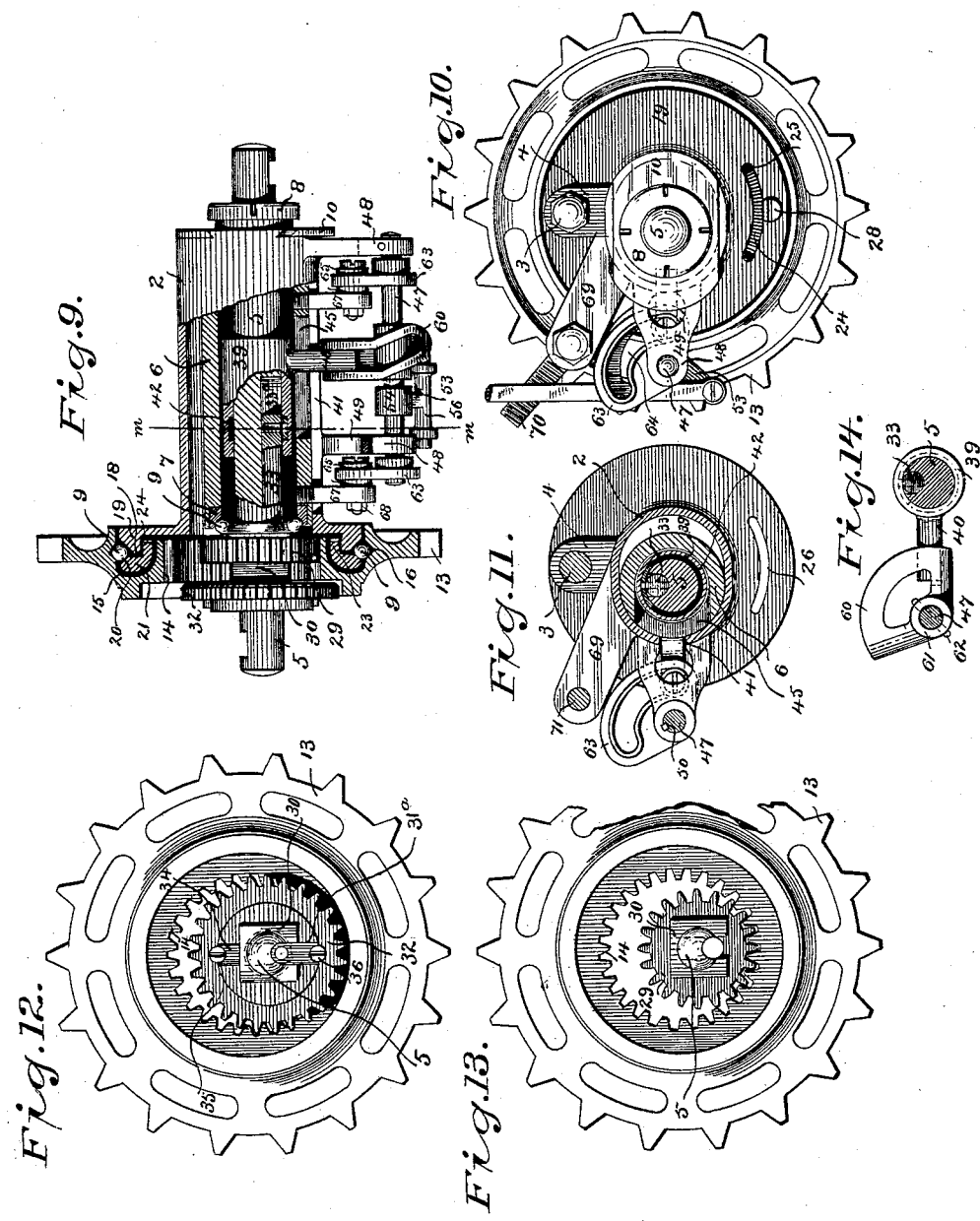
WITNESSES:
H. A. Lamb
Edith G. Ely.
INVENTOR
Frank Jewett
BY
A. M. Wooster
ATTORNEY.

UNITED STATES PATENT OFFICE.

FRANK JEWETT, OF NEW HAVEN, CONNECTICUT.

BICYCLE.

SPECIFICATION forming part of Letters Patent No. 481,569, dated August 30, 1892.

Application filed November 2, 1891. Serial No. 410,698. (No model.)

*To all whom it may concern:*

Be it known that I, FRANK JEWETT, a citizen of the United States, residing at New Haven, in the county of New Haven and State of Connecticut, have invented certain new and useful Improvements in Bicycles; and I do hereby declare the following to be a full, clear, and exact description of the invention, such as will enable others skilled in the art to which it appertains to make and use the same.

My invention has for its object to so improve the construction of Safety bicycles that by a simple movement, which the rider may make without dismounting, the gearing may be changed from a fast to a relatively slow speed, or vice versa, or the sprocket and pedal-shaft may be disconnected, so that the pedals will not revolve in coasting.

With these ends in view I have devised the novel construction and combinations of parts, of which the following description, in connection with the accompanying drawings, is a specification, numbers being used to designate the several parts.

Figure 1 is a side elevation of a well-known style of Safety bicycle, illustrating the application thereto of my novel improvement; Fig. 2, an end elevation of the pedal-shaft, pedal-shaft box, and sprocket as seen from the right in Figs. 3 and 4, the parts being in position to produce the fast speed; Fig. 3, a section on the line $x\ x$ in Fig. 2, looking toward the right, the same section-line being also indicated in Fig. 5; Fig. 4, a section on the line $y\ y$ in Fig. 2, the rock-shaft and the arms by which it is carried appearing in plan; Fig. 5, an end elevation of the sprocket as seen from the left in Fig. 4; Fig. 6, an end elevation of the sprocket with the clutch-gear removed; Fig. 7, a section on the line $z\ z$ in Figs. 3 and 4, looking toward the left, the sprocket being removed; Fig. 8, edge and side detail views of the clutch-operating cam; Fig. 9, a section corresponding with Fig. 4, except that the clutch-gear is in elevation and the clutch-operating cam has been oscillated to place the parts in position to produce the slow speed; Fig. 10, a view corresponding with Fig. 2, except that the parts are in position to produce the slow speed; Fig. 11, a view corresponding with Fig. 7, except that the parts are in position to produce the slow speed, the section-line being indicated by $m\ m$ in Fig. 9; Fig. 12, a view corresponding with Fig. 5, except that the parts are in position to produce the slow speed; Fig. 13, a view corresponding with Fig. 6, except that the parts are in position to produce the slow speed; and Fig. 14 is a detail view corresponding with the right view in Fig. 8, showing the clutch-operating cam in position to produce the slow speed.

1 denotes the frame of a bicycle, which may be of any preferred style, my invention being equally applicable to any of the various styles of Safety bicycles without change in the principle involved, certain immaterial modifications in the construction and arrangement of parts being of course required to adapt my improvement to the various styles of frames.

2 denotes the case, which carries the pedal-shaft and which is attached to the frame by a bolt 3, passing through lugs 4 and through certain rigid parts of the frame, as clearly indicated in Fig. 1.

5 denotes the pedal-shaft, which lies within a box 6 in the case. At both ends of the box are chilled rings 7, which form parts of ball-bearings near the ends of the shaft. The left end of the shaft (the right end as seen in Fig. 3) is screw-threaded and is engaged by a nut 8, the inner end of which constitutes the other part of the ball-bearing at that end of shaft, the balls 9 lying between the curved inner face of said nut and the curved outer face of the corresponding chilled ring. The end of the case is closed by a plate 10, which slides in dovetail ways in the case, (see Fig. 3,) the nut passing through a hole in the plate.

11 is a spring-washer lying between the head of the nut and the plate. The bearing at the other end of the pedal-shaft consists of the other chilled ring 7 and a chilled ring 12 on the pedal-shaft, balls 9 being placed between said rings the same as at the other end of the shaft.

13 denotes the sprocket, which has an opening through it and is provided with internal gear-teeth 14. In the inner face of the sprocket is a circular groove 15, and in the outer radial edge of the groove is a V-shaped groove 16, which constitutes part of a ball-bearing between the case and the sprocket, the other parts of said bearing being a surface 17 at the inner edge of a flange 18 on a disk 19 at the right end of the case (the left end, as seen in Fig. 3) and a surface 20 on a ring 21, said surface lying at right angles to surface 17 and to one of the surfaces of V-shaped groove 16. Flange 18 is provided with internal screw-threads 22, which are engaged by corresponding screw-threads on a flange 23 on ring 21. The face of flange 23 is provided with teeth 24 (see Figs. 2 and 10) and with holes 25 for engagement by a spanner or other tool in adjusting the bearing. Disk 19 is provided with a slot 26, which is closed by a plate 27, held in place by a turn-button or screw-head 28. The inner face of plate 27 is provided with teeth (not shown) corresponding with teeth 24 on flange 23, said teeth acting to lock the ring in place. Whenever it is required to adjust the bearing of the sprocket-button 28 is turned, plate 27 removed, and ring 21 turned to give the desired adjustment. Plate 27 is then replaced in slot 26, the teeth upon the inner face of the plate engaging teeth 24, and the plate is again locked in position by the turn-button. It will of course be understood that both bearings of the pedal-shaft are adjusted at the same time by turning nut 8.

29 denotes a pinion on the pedal-shaft within the opening in the sprocket, the pinion being narrower than the internal teeth of the sprocket, as clearly shown in Figs. 3 and 9, and adapted to engage said sprocket, as will presently be fully explained. Outside of the pinion the pedal-shaft is made square, as at 30, said square portion being provided with a slot 31, extending through it.

32 denotes a clutch-gear having an opening to receive the square portion and adapted to lie in the opening in the sprocket close to the pinion and when in that position to engage the internal teeth of the sprocket. This clutch-gear is carried by a rod 33, which lies in a recess 33ª in the pedal-shaft. The outer end of the rod is shown as reduced and screw-threaded and the clutch as secured thereto by a cross-piece 34, which extends through slot 31 and through a slot 31ª in the sprocket. The reduced threaded end of the rod engages the cross-piece, as clearly shown in Figs. 3, 4, and 5, and the ends of the cross-piece and the ends of slot 31ª are provided with threaded half-sockets 35, which receive screws 36, whereby the rod, cross-piece, and clutch-gear are firmly locked together. The outer face of the central portion of the cross-piece is rounded and the outer end of slot 26 is also rounded, as clearly shown in Fig. 4. The special object of this construction is to give the required movement of the clutch-gear with the least possible cutting away of metal and without weakening the parts to any appreciable extent. The outer face of the sprocket, the clutch-gear, and pinion are covered by a cap 37, having an opening through it. 38 is a spring-washer bearing against the outer face of the cap which covers the opening and is held in position after assembling by the pedal. (Not shown.)

It will of course be understood that power is applied to the pedal-shaft in the usual manner, from whence it is communicated to the sprocket by means of either pinion 29 or clutch-gear 32, both of which are adapted to engage the internal gear-teeth of the sprocket. The pinion and clutch-gear are respectively thrown into and out of operative position by mechanism which I will now describe.

39 denotes a sliding sleeve on the pedal-shaft, which is provided with an arm 40, extending outward through a slot 41 in the side of the case. This sleeve is provided with an internal groove 42, which just receives a curved plate 43, said plate being secured to rod 33 by a screw 44. It will be seen that this construction permits the pedal-shaft to rotate freely within the sliding sleeve and at the same time connects rod 33 with the sleeve, so that lateral movement of said sleeve on the pedal-shaft will move the rod in or out, carrying the clutch-gear with it.

45 is a slot in the side of the box, through which the sleeve is passed in assembling. In order to connect or disconnect the clutch-gear from the sprocket, it is therefore simply necessary to move the sliding sleeve laterally upon the pedal-shaft. Still another movement, however, is required to connect the pinion with the internal gearing of the sprocket. This result is accomplished by moving the box, pedal-shaft, and the parts carried thereby laterally in the case. The box is held against endwise movement in the case by means of a key or spline 46, which engages both case and box, holding the latter rigidly against endwise movement, but permitting ample lateral movement to connect and disconnect the pinion.

47 is a rock-shaft journaled in arms 48, which extend outward from the case. The slot 41 in the side of the case also extends into these arms, the outer ends of the slots in the arms being enlarged, as at 49, to permit the studs which engage the side cams to be passed through in assembling. The rock-shaft is provided with a longitudinal groove 50, in order to permit adjustment of the cams carried thereby, and at one end with a circular groove 51, which is engaged by a pin 52 in one of the arms.

53 denotes the arm by which the rock-shaft is operated. This arm is provided with a collar 54, which is rigidly secured to the rock-shaft by a pin 55 which passes through the shaft. At the outer end of arm 53 is a cross-piece 56, which is engaged by the branches of a bifurcated rod 57, the upper end of which is provided with three notches 58, either of which is adapted to engage a plate 59, secured to the frame of the machine. (See Fig. 1.)

60 is a cam having a groove in its edge, which is engaged by the arm 40, which extends outward from sliding sleeve 39. This cam is provided with a sleeve 61 and is rigidly secured to the rock-shaft by a pin 62, which passes through the shaft. It will be seen that when the rock-shaft is oscillated the end of the arm will ride along the oblique portion of the slot, thereby moving sliding sleeve 39 on the pedal-shaft and carrying the clutch-gear into or out of engagement with the internal teeth of the sprocket.

63 denotes cams keyed to the rock-shaft, which are provided with eccentric slots 64. These slots are engaged by beveled collars 65 on studs 66, which themselves engage arms 67, extending outward from the box and passing through slot 41 in the side of the case. One end of each stud 66 is threaded and is engaged by a nut 68. The beveled collars may be adjusted at any time to take up lost motion by tightening this nut. The edges of eccentric slots 64 are beveled to correspond with the beveled collars, as clearly shown in Fig. 7.

69 denotes an arm extending outward from the case.

70 is a threaded rod having at one end an angle-piece 71, which is pivoted in the outer end of arm 69. The threaded rod extends through an arm 72, extending from the frame of the machine, and is held in position by a nut 73. The chain is adjusted in use by simply screwing down nut 73 on the threaded rod. This draws the threaded rod forward and swings the case, box, pedal-shaft, pedals, &c., upon bolt 3, by which they are secured to the frame.

The operation is as follows: In Figs. 1 to 8, inclusive, the parts are shown in position to produce a relatively fast speed. It will of course be understood that the number of teeth in the clutch-gear will always correspond with the number of internal teeth in the sprocket, so that when the clutch-gear is in engagement each rotation of the pedal-shaft will produce a rotation of the sprocket and that the difference between the fast and slow speeds will depend upon the difference in number between the teeth of the pinion and the internal teeth of the sprocket. In the present instance I have shown the sprocket as provided with twenty-seven internal teeth, the clutch-gear as provided with an equal number of teeth, and the pinion as provided with twenty teeth. A very satisfactory gearing for ordinary road-riding is a fast speed of sixty and a slow speed of forty-five. Upon ordinary smooth and level roads there is ample power to drive the machine easily when the clutch-gear is engaged with the internal teeth of the sprocket. Where the roads are muddy or sandy or the grade steep, I at once manipulate rod 57, throw the clutch-gear out of engagement with the internal teeth of the sprocket, and place the pinion in engagement therewith. This reduces the speed one-fourth, (more or less,) giving the corresponding increase of power, which enables the rider to drive the machine over bad roads and up steep grades with comparative ease, in fact where it would be practically impossible to drive a machine geared to "54" or upward. I use the term "geared to 54" to mean a gearing that will produce a forward movement equal to a 54-inch wheel for each revolution of the pedal-shaft. Suppose the parts to be in the position shown in Figs. 1 to 8, inclusive, and that the rider desires to change to the slow speed. He simply without dismounting disengages the lower notch 58 in rod 57 from plate 59, forces the rod downward and then engages the upper notch with the plate. This movement oscillates the rock-shaft, carrying with it cams 60 and 63. The first movement is produced by cam 60, which moves sliding sleeve 39 on the pedal-shaft and throws the clutch-gear out of engagement with the internal gear-teeth of the sprocket, the position of the parts changing from that shown in Figs. 3, 4, and 5 to that shown in Fig. 9. No movement of the box takes place, however, until the lateral movement of the sliding sleeve is finished. This result I accomplish by making the portion of slots 64, which first act on the beveled collars on studs 66, arcs of circles concentric with the rock-shaft. The instant the clutch-gear is out of engagement with the internal gear of the sprocket the collars pass into the eccentric portions of slots 64, the action of which is to draw the box, pedal-shaft, &c., outward from the position shown in Figs. 2 and 7 to that shown in Figs. 10 and 11, thereby placing the pinion in engagement with the internal teeth of the sprocket, as clearly shown in Fig. 13. The instant the riding becomes good again the operator disengages the upper notch 58 from plate 59, draws rod 57 upward, and engages the lower notch with the plate, as clearly shown in Fig. 1. This changes the parts from the position shown in Figs. 9 to 14 in the drawings to that shown in Figs. 1 to 8. Arm 53 is made long enough to give ample leverage to make the rock-shaft oscillate easily. In practice a machine built as illustrated in these drawings operates with perfect smoothness and ease. An ordinary rider is able to change from slow speed to fast speed, and vice versa, without dismounting and without inconvenience.

Another important feature of my improved construction is that by stopping the movement in either direction midway I leave both pinion and clutch-gear disconnected from the internal gear-teeth of the sprocket, so that if in coasting the operator chooses to engage the middle notch 58 with plate 59 and hold both feet on the pedals the sprocket will be carried around by the movement of the rear wheel and chain, but the pedals and pedal-shaft will remain stationary. It will of course be understood that if this disconnection of the pedal-shaft and sprocket is produced from slow speed it will be at the instant the pinion is moved out of engagement with the internal gear-teeth and before the lateral movement of the sliding sleeve and rod which places the clutch-gear in engagement, and if the disconnection is produced from the fast speed it is at the instant the lateral movement of the sliding sleeve and rod has disconnected the clutch-gear from the internal gear-teeth of the pinion and before the lateral movement of the box and pedal-shaft has placed the pinion in engagement with the internal gear-teeth of the sprocket.

Having thus described my invention, I claim—

1. The combination, with a sprocket having internal gear-teeth, of a pedal-shaft carrying a pinion having a less number of teeth than the sprocket, a movable box which carries the pedal-shaft, a clutch-gear adapted to engage the sprocket, and suitable mechanism for moving the clutch-gear into and out of operative position and for moving the box and pedal-shaft laterally to engage and disengage the pinion and sprocket, so that when the cam-gear is disengaged and the pinion engaged with the sprocket a relatively slow speed is produced with corresponding increase of power and when neither clutch-gear nor pinion is engaged with the sprocket the latter is left wholly disconnected from the pedal-shaft.

2. The combination, with a sprocket having internal gear-teeth, of a pedal-shaft carrying a pinion having a less number of teeth than the sprocket, a movable box carrying the pedal-shaft, and suitable mechanism for moving the box and pedal-shaft laterally to engage and disengage the sprocket.

3. The combination, with a sprocket having internal gear-teeth, of a pedal-shaft carrying a pinion and having a square portion outside of the pinion, said square portion having a slot 31, a clutch-gear having an opening to receive said square portion, and a slot 31ª, a rod 33, and a cross-piece lying in slots 31 and 31ª and rigidly secured to the cross-piece and clutch-gear.

4. The combination, with the sprocket having internal gear-teeth and the pedal-shaft having a longitudinal recess, a square portion 30, and a slot 31, of clutch-gear 32, having an opening to receive the square portion of the shaft, and a slot 31ª, a cross-piece lying in said slot, said cross-piece and the ends of slot 31ª having threaded half-sockets, screws engaging said half-sockets, which connect the cross-piece and clutch-gear, and rod 33, lying in the recess in the pedal-shaft and engaging the cross-piece, by which the clutch-gear is moved into and out of operative position.

5. The sprocket, having internal gear-teeth and the pedal-shaft, in combination with a clutch-gear adapted to engage the internal teeth of the sprocket, a sliding sleeve 39 on the pedal-shaft, having an internal groove 42 and rod 33, one end of which is attached to the clutch-gear and the other provided with a curved plate 43, engaging the groove, so that longitudinal movement of said sleeve will move the clutch-gear into and out of engagement with the sprocket.

6. The combination, with the sprocket having internal gear-teeth, the pedal-shaft, the clutch-gear, and rod 33, by which the clutch-gear is engaged and which is provided with a curved plate 43, of a sliding sleeve on the pedal-shaft, having an arm 40 and an internal groove 42, which receives the curved plate, and a cam which engages arm 40 to move the sleeve longitudinally on the pedal-shaft.

7. The combination, with the sprocket having internal gear-teeth and the pedal-shaft having a pinion with a less number of teeth than the sprocket, of a box by which the pedal-shaft is carried, arms 67, extending outward from the box and carrying studs 66, and cams engaging said studs, by which the box and pedal-shaft are moved laterally to engage and disengage the pinion and sprocket.

8. The combination, with the sprocket having internal gear-teeth, the pedal-shaft carrying pinion 29, the clutch-gear, rod 33, by which it is carried, sliding sleeve 39, which is engaged by rod 33 and is provided with an arm 40, a box carrying the pedal-shaft and sleeve and provided with arms 67, and a rock-shaft carrying cams 60 and 63, by which the sliding sleeve is moved on the pedal-shaft to engage and disengage the clutch-gear and sprocket and the box and pedal-shaft are moved laterally to engage and disengage the pinion and sprocket.

9. The combination, with the case having arms 48 and slot 41, of the pedal-shaft, sliding sleeve 39, having arm 40, the box having arm 67, carrying studs 66, a rock-shaft journaled in arms 48 and carrying cams 60 and 63, operating-arm 53, keyed to the rock-shaft, and rod 57, pivoted to the operating-arm by which the pedal-shaft is oscillated.

10. The combination, with the frame of a bicycle having a plate 59, the case, box, pedal-shaft, pinion, clutch-gear, rod 33, and sliding sleeve, substantially as described and shown, of a rock-shaft carrying cams 60 and 63 and arm 53, rod 57, pivoted to said arm and having notches 58, and intermediate connections, substantially as described and shown, between the cams and the sliding sleeve and box, so that when the lower notch is engaged with plate 59 the clutch-gear will be placed in engagement with the sprocket and when the upper notch is engaged with said plate the pinion will be placed in engagement with the sprocket and when the intermediate notch is engaged with said plate the pedal-shaft and sprocket will be wholly disconnected.

11. The combination, with the case, the pedal-shaft, and the box, of suitable means for moving the box and pedal-shaft laterally in the case, and a key 46, engaging both case and box, whereby the latter is held against endwise movement but left free to be moved laterally.

12. The combination, with the case having disk 19, provided with flange 18, surface 17, and screw-threads 22, of the sprocket having V-shaped groove 16, ring 21, having surface 20, and screw-threads engaging threads 22, and balls between said surfaces.

13. The combination, with the case and disk 19, having slot 26 and threaded flange 18, and the sprocket having V-shaped groove 16, of ring 21, threaded to engage the flange and having teeth 24 and holes 25 for the purpose of adjustment, balls between said flange, ring, and sprocket, and a plate lying in slot 26 and engaging teeth 24, by which the ring is locked in place after the bearing has been adjusted.

14. The combination, with the case, the box, the pedal-shaft, and the sprocket, of cap 37, secured to the sprocket and having an opening through it, spring-washer 38, carried by the pedal-shaft and covering the opening, nut 8, engaging the pedal-shaft, and plate 10, through which the nut passes and which slides in ways in the case.

In testimony whereof I affix my signature in presence of two witnesses.

FRANK JEWETT.

Witnesses:
A. M. WOOSTER,
EDITH G. ELY.